US011841886B2

(12) United States Patent
Mckibbin et al.

(10) Patent No.: US 11,841,886 B2
(45) Date of Patent: Dec. 12, 2023

(54) RECOMMENDATION SYSTEM FOR CHANGE MANAGEMENT IN A QUALITY MANAGEMENT SYSTEM

(71) Applicant: Soladoc, LLC, Indianapolis, IN (US)

(72) Inventors: Jason Mckibbin, Carmel, IN (US); Tyler Foxworthy, Indianapolis, IN (US)

(73) Assignee: Soladoc, LLC, Indianapolis, IN (US)

( * ) Notice: Subject to any disclaimer, the term of this patent is extended or adjusted under 35 U.S.C. 154(b) by 0 days.

(21) Appl. No.: 17/473,779

(22) Filed: Sep. 13, 2021

(65) Prior Publication Data

US 2022/0083578 A1 Mar. 17, 2022

Related U.S. Application Data

(60) Provisional application No. 63/076,994, filed on Sep. 11, 2020.

(51) Int. Cl.
*G06F 16/33* (2019.01)
*G06F 16/338* (2019.01)

(52) U.S. Cl.
CPC ........ *G06F 16/3344* (2019.01); *G06F 16/338* (2019.01)

(58) Field of Classification Search
CPC ............................ G06F 16/3344; G06F 16/338
See application file for complete search history.

(56) References Cited

U.S. PATENT DOCUMENTS 9,183,499 B1 * 11/2015 Krivokon ................. G06N 5/02
2013/0268285 A1 * 10/2013 Backes .................. G16H 40/40
702/183

* cited by examiner

*Primary Examiner* — Van H Oberly
(74) *Attorney, Agent, or Firm* — Ice Miller LLP (57) ABSTRACT

A quality management system (QMS) contains a collection of documents and content relating to interdependent policies, processes, and procedures required for planning, manufacturing, and marketing complex products. Change management refers to the way a company manages modifications to products and processes within their business and the potential impacts of those changes. A core part of change management is to understand what may be impacted by the change, why it impacted, and how to assess and or identify the risk of the change throughout the company and quality/regulatory processes. The impact assessment is a core part of the process to ensure one does not make changes that create a product and/or process failures as well as evaluating the regulatory impact of such changes. The disclosure pertains to a recommendation system for change management that maps the dependencies between the document contained in the QMS, allows the searching for related documents based on user-supplied criteria, and includes interactive visualization of inter-document dependencies.

17 Claims, 7 Drawing Sheets

RECOMMENDATION SYSTEM FOR CHANGE MANAGEMENT IN A QUALITY MANAGEMENT SYSTEM

CROSS-REFERENCE TO RELATED APPLICATION

The present application claims priority to U.S. Provisional Patent Application Ser. No. 63/076,994, filed on Sep. 11, 2020, which is incorporated in its entirety herein.

BACKGROUND

Change management poses a number of significant challenges for manufacturers of complex products, such as medical devices, trying to keep pace with market competition, and shifting regulatory requirements. Quality management processes are often highly integrated and referential, confounding the task of evaluating the risk of changing a particular feature or process.

Documents in a Quality Management System (QMS) may be connected on the basis of either an explicit reference (e.g. a citation network) or implicitly due to common subject matter (e.g. a semantic association or co-reference). The collection of the documents contained in a QMS may be represented as a directed network, whose attributes may be analyzed using graph-theoretic techniques or visualized to identify novel document associations or risk factors.

It should be appreciated that there are implicit associations between QMS documents that are not known or captured a priori by all users, but nonetheless these associations may be relevant to the change management process.

QMS users frequently make changes to process and procedures, often in an asynchronous manner. Unsynchronized changes in interdependent and related processes can result in significant regulatory risks and an increase in the likelihood of harm to patients.

The impact of a change in any particular process may be non-linear and arise through indirect or implied inter-process dependencies; the magnitude and direction of such impacts are governed by the latent network topology implied by the QMS document network. The impact of any change may be quantified and anticipated using graph-theoretic statistical techniques.

SUMMARY OF THE INVENTION

Quality Management Systems (QMS) create the framework for a company to demonstrate its product(s) consistently meet applicable requirements and specifications while integrating product life-cycle risk management that evaluate whether products may be safe and effective. A recommendation system for change management in a QMS can alert user to risks that may result from changes to one or more QMS objects, based on a derived dependency network between QMS objects. The recommendation system can provide other recommendations on actions to take to identify or mitigate risk. According to some embodiments of the present disclosure, a system and method that provides recommendations for managing QMS object changes is provided. A computing device can be configured to extract structured metadata from one or more QMS objects, such metadata including latent references to other objects within the QMS. According to some embodiments, natural language processing techniques can be applied to extract the structured metadata. Utilizing the extracted structured metadata, systems and methods are provided to identify meaningful relationships between QMS objects, and to perform calculations pertaining to potential risks arising from a change in any given QMS object. By managing risks associated with changes requested for QMS objects, embodiments disclosed herein can improve real time visibility and recommendations to mitigate risk of QMS change management processes, create significant efficiencies in the change process, and improve the quality of medical device products encompassed by the QMS.

DETAILED DESCRIPTION OF THE INVENTION

Embodiments described herein improve change management processes in a QMS. Specifically, embodiments described herein improve real time visibility and recommendations to mitigate risk of QMS change management processes, create significant efficiencies in the change process, and improve the quality of medical device products encompassed by the QMS. Some embodiments may be implemented in hardware, firmware, software, or any combination thereof. Embodiments may also be implemented as instructions stored on a machine-readable medium, which may be read and executed by one or more processors. A machine-readable medium may include any mechanism for storing or transmitting information in a form readable by a machine (e.g., a computing device). For example, a machine-readable medium may include read only memory (ROM); random access memory (RAM); magnetic disk storage media; optical storage media; flash memory devices, and others. Further, firmware, software, routines, instructions may be described herein as performing certain actions. However, it should be appreciated that such descriptions are merely for convenience and that such actions in fact result from computing devices, processors, controllers, or other devices executing the firmware, software, routines, instructions, etc.

Figure 1:
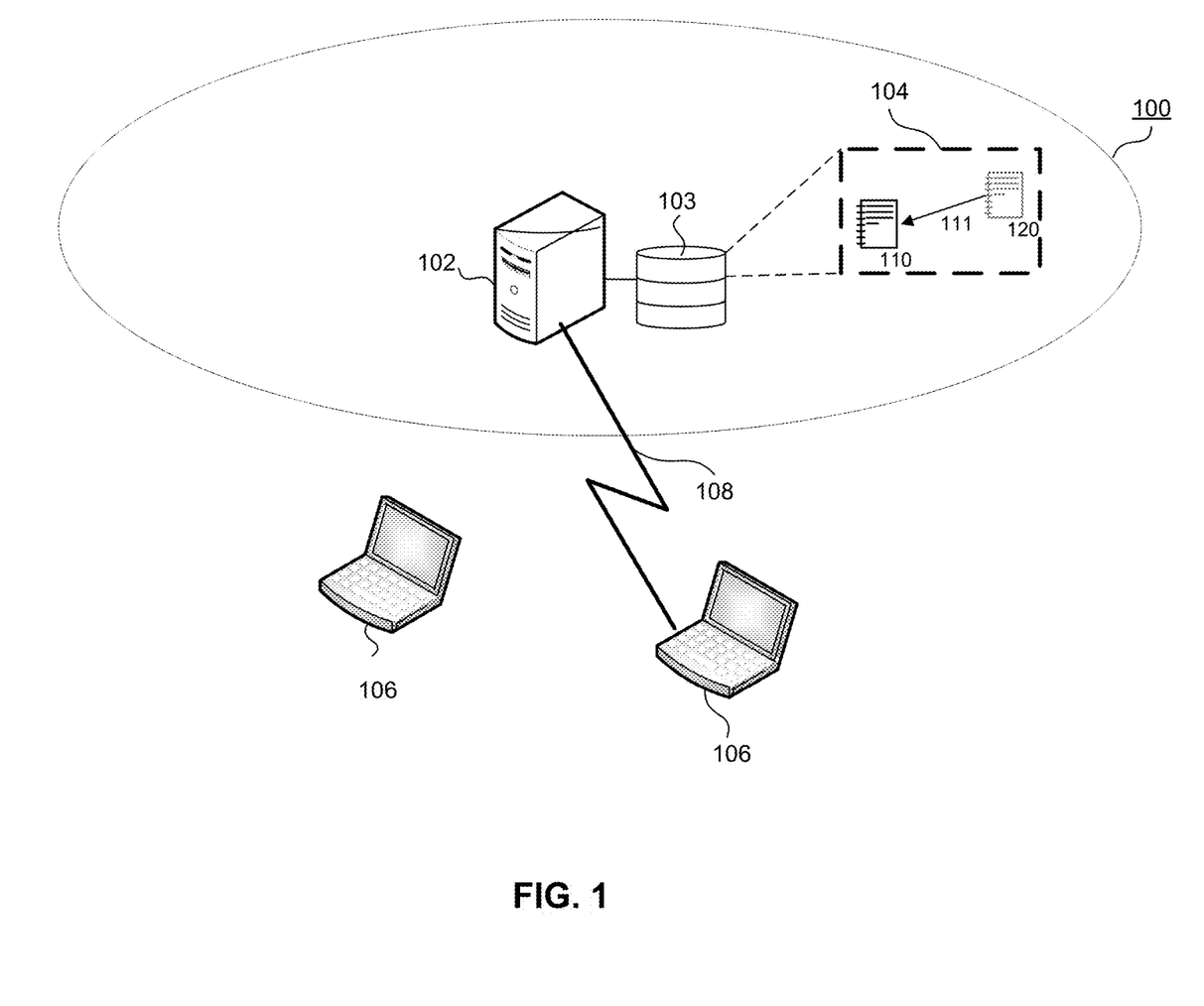
FIG. 1 is an illustration of a recommendation system for change management in a QMS, according to some embodiments.

FIG. 1 illustrates a recommendation system 100 for change management in a quality management system (QMS). Recommendation system 100 can include a server 102 and a database 103. The United States Food and Drug Administration (FDA) mandates that all manufacturers of medical devices must establish and maintain procedures for the identification, documentation, validation or where appropriate, verification, review, and approval of design, document, and production and process changes before their implementation. Change management refers to the way a device manufacturer implements these procedures and is a significant aspect of a QMS.

Server 102 can include (i.e., be coupled to) a processor, and can be configured to connect operably to database 103. Server 102 can be configured to perform instructions to carry out change management and recommendations related to changes made in a QMS.

Database 103 can store elements of a QMS 104 such as one or more QMS objects (e.g., 110, 120) and one or more inter-object relationships (e.g., 111). A QMS contains a collection of documents and other content relating to interdependent policies, processes, and procedures required for planning, manufacturing, and marketing complex products such as medical devices. QMS objects can include, but are not limited to, elements stored in a QMS, such as QMS documents, product development artifacts, quality processes, corrective and preventative actions (CAPAs), complaints, audits, nonconformances, change records, and the like.

According to some embodiments, server 102 is configured to receive an input 108 from a user device 106. Input 108 can include information relating to a proposed change to one or more QMS objects (e.g., 110 and/or 120). According to some embodiments, input 108 can be provided via a graphical user interface (GUI). In one non-limiting example, input 108 can include a written description of a change to one or more QMS objects. In another non-limiting example, input 108 can also include justification for the change.

According to some embodiments, server 102 can be configured to extract structured metadata from the one or more QMS objects. Metadata features can include latent references to other objects within the QMS, either by name or unique identifier, one or more keywords, and/or vectorized topic representations. In some embodiments, server 102 can apply natural language processing techniques to extract the structured metadata Utilizing the extracted structured metadata, recommendation system 100 for change management can be configured to identify meaningful relationships between QMS objects, and to perform calculations pertaining to potential risks arising from a change in any given QMS object.

In some embodiments, server 102 can automatically analyze the objects contained in a QMS, identify meaningful relationships between said objects, perform calculations pertaining to potential risks arising from a change in any given QMS document, interactively display the relationships and dependencies between objects, and generate recommendations and alerts to users of the system. According to some embodiments, recommendation system can automatically analyze the QMS objects utilizing artificial intelligence methods and techniques, such as machine learning, and the like. As described above, recommendation system 100 can perform natural language processing to extract metadata features from one or more QMS objects.

In one non-limiting example, server 102 can perform operations to categorize elements or clauses of a QMS object based on semantic rules. For example, server 102 can be configured to characterize an element as a noun, verb, etc. Then, recommendation system 100 can apply one or more pre-programmed grammatical rules. Alternatively, server 102 can perform operations to apply one or more trained rules, based on machine learning prediction algorithms, to discern metadata features disposed in the QMS object.

Additionally, or alternatively, server 102 can perform analysis based on sentiment analysis, topical analysis, quantitative analysis, keyword analysis, and any other natural language processing technique.

Based on QMS object analysis, server 102 can extract metadata features from the one or more QMS objects. Also, server 102 can aggregate QMS objects to form a directed graph data structure. That is, recommendation system can identify dependency relationships between one or more pairs of objects in the QMS, the relationship being implied by their respective metadata features. In some embodiments, the relationship may be based on an inter-object linkage informed directly by user input 108.

Server 102 can be configured to generate this directed graph representation of the QMS (also referred to as a dependency network). Server 102 can store the directed graph representation in a searchable computer database, such as database 103.

In the context of this disclosure, risk is defined as a statistical measure of the likelihood that a change in one or many interdependent QMS objects may contradict or invalidate the stated policies and procedures of another. The impact of a change may be determined in a bi-directional manner, such that for any pair of objects (e.g., objects A and B), the risks of a directed impact (A->B or B->A) are potentially asymmetrical $|R(A\text{->}B)-R(B\text{->}A)|>=0$. The aggregate risk associated with a change in a particular object towards all other objects in the QMS can be referred to as the impact score.

Recommendation system 100 can alert the user to the presence of such risks according to the statistical attributes of the derived dependency network or provide other recommendations on actions to take to identify or mitigate risk.

It should be appreciated that, even if that object itself has not changed, the impact score of any given object may vary over time because the impact potential of an object is almost entirely dependent on the topology of the entire dependency network. As such, non-localized changes to one or many objects may significantly impact risk calculations for all other members of the QMS. The topology of the dependency network will also vary as a function of the addition and deletion of new objects over time.

According to some embodiments, server 100 can transmit an alert or notification user device 106 of changes in the impact score of one or many objects and generate visual representations reflecting the temporal variation of such statistics over time. In some embodiments, recommendation system 100 can also enable users to search the QMS database according to the metadata features extracted from the user-supplied objects and according to the connectivity to other objects implied by these features. Accordingly, the system is capable of ranking the relevance of objects to a user-supplied query based on the combination of search parameters and the proximity of matching objects in the dependency network. The system is also capable of ranking search results based on the impact score. It should be appreciated that this parametric network search capability represents a novel feature of this invention.

According to some embodiments, recommendation system 100 can generate or cause to be displayed (e.g., on a display of user device 106) a graphical user interface that includes an interactive visualization of the QMS contents and dependency network. In this visualization, each object is represented with an icon featuring the name or unique identifier of each object or other QMS entity. The size, color, and shape of such icons may vary according to the category of the object or any other metadata attribute, including but not limited to an object's impact score. The relationships between any given pair of objects indicated by the dependency network are represented by an edge/arrow connecting the two object icons. The color, width, and labeling of the arrows may vary according to known attributes of the inter-object relationship, including but not limited to the risk score.

Figure 2:
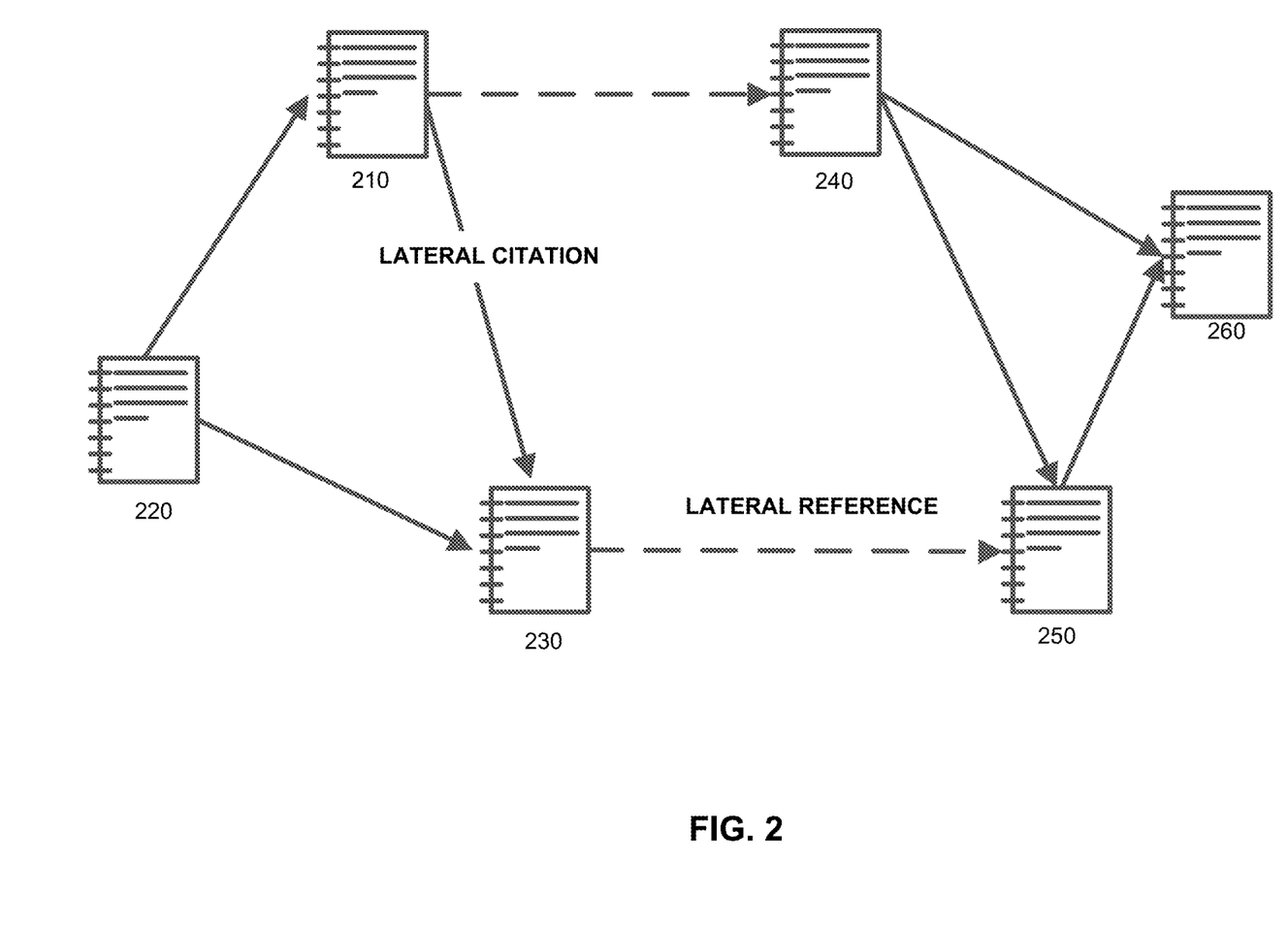
FIG. 2 is an illustration of an example QMS, according to some embodiments.

FIG. 2 illustrates QMS objects in a QMS network 200. As shown in FIG. 2, relationships between a set of QMS objects 210, 220, 230, 240, 250, and 260 and their respective relationships shown as a set of edges (or arrows) connecting pairs of objects.

The relationships between QMS objects 210 to 260 can vary according to some criteria determined by the system. Relationships between documents may be formed based on a direct literal citation, supplied explicitly by the user of the system. As shown QMS object 210 has a direct literal citation relationship with QMS objects 220 and 230. Relationships of this variety are depicted in the illustration with a solid edge and are of type "LITERAL CITATION." Relationships between documents that are determined according to a probabilistic function are referred to as a latent reference. For example, as shown in FIG. 2, QMS object 210 has a latent reference relationship with QMS object 240, and QMS object 230 has a latent reference relationship with QMS object 250. This type of relationship is depicted with a dashed line and the type "LATENT REFERENCE." Recommendation system 100 is configured to determine a dependency network that includes one or more QMS objects, as well as literal citation relationships and latent reference relationships, such that aggregate risk of a QMS object change can be accurately determined and reported to users.

Figure 3:
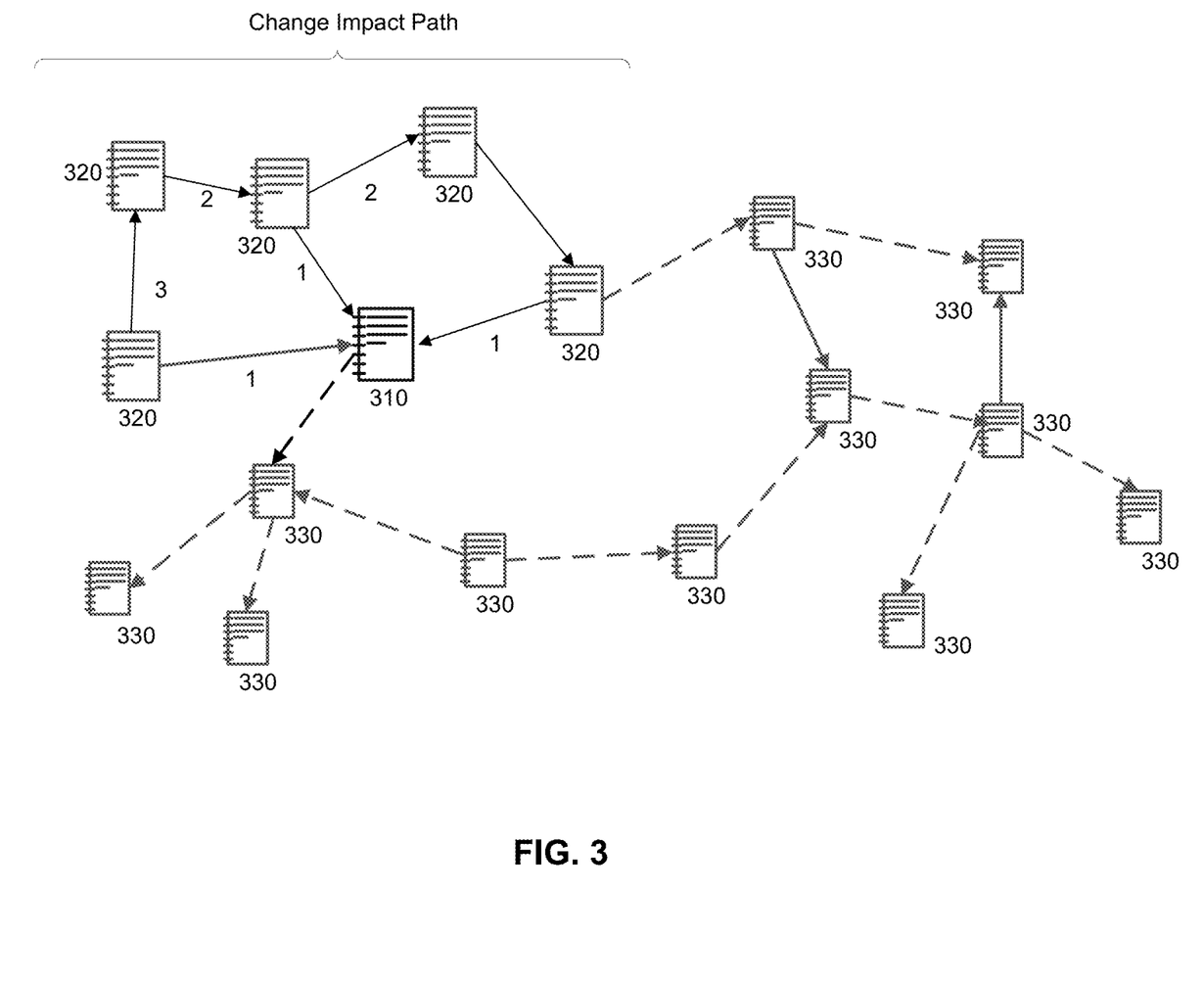
FIG. 3 is an illustration of an example QMS, according to some embodiments.

FIG. 3 illustrates QMS objects in a QMS network 300. Referring to FIG. 3, a change in a node within a network of linked QMS objects (e.g. the QMS network) can impact other nodes throughout the network according to their connectivity structure. In this illustration, the change node 310 (i.e., the node that is being changed) is shown in relation to other linked QMS objects 320 and 330. The subset of nodes 320 that directly and indirectly reference this node are depicted as documents with numbers (e.g., 1 to 3) indicating their impact distance and are encompassed by a label "Change Impact Path". The set of remaining nodes 330 in the QMS network that are not likely impacted by the change are depicted in FIG. 3 as a gray set of documents 330 with dashed directed edges.

Figure 4A:
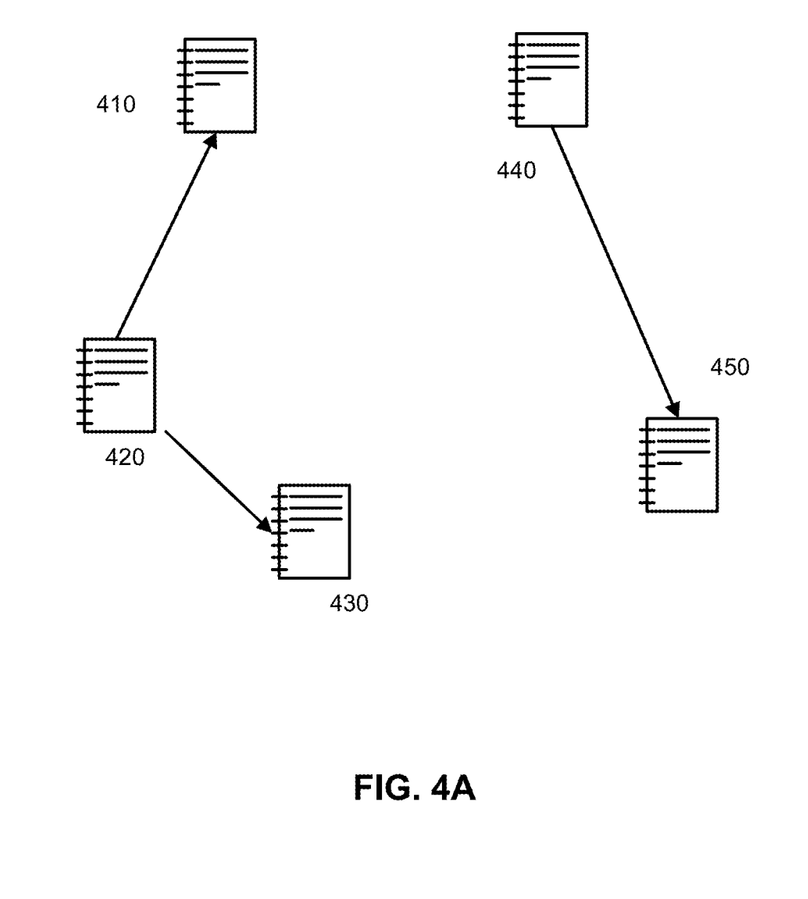
FIGS. 4A and 4B is an illustration of an example QMS at a finite time, and upon occurrence of a change, respectively, according to some embodiments.

FIG. 4A illustrates a state of QMS network 400, which may be an embodiment of QMS network 200 or 300, at a finite point in time. The elements of the QMS network are shown as QMS objects 410, 420, 430, 440, and 450.

Figure 4B:
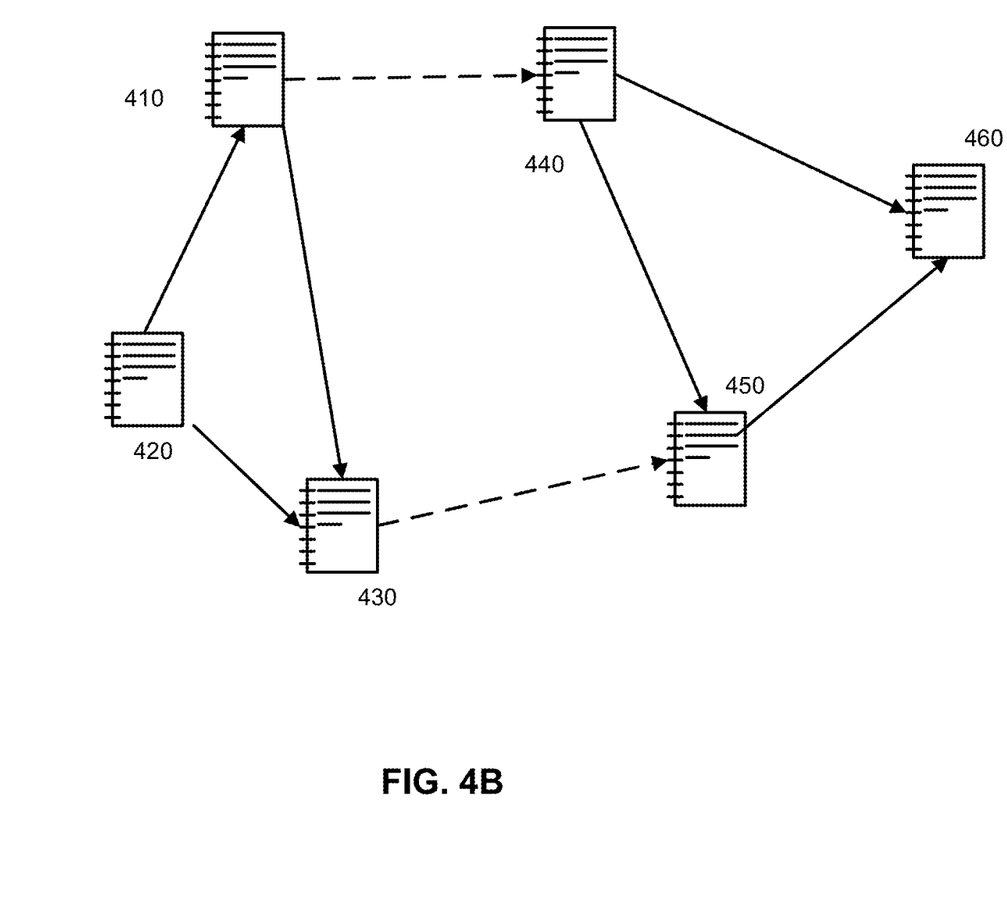

FIG. 4B illustrates the state of QMS network 400 at a finite point in time, after a series of changes are made to QMS objects 410, 430, and 440, and also following the addition of a new element, QMS object 460. As shown, changes to any element of the QMS network may introduce new explicit and latent referential relationships between objects in QMS network 400, and that these changes may introduce a nontrivial change into the relative impact risk of a change to any given document and that such changes would be difficult for a human reviewer to identify and quantify the extent of such risks.

It should be understood that the operations shown in the exemplary methods are not exhaustive and that other operations can be performed as well before, after, or between any of the illustrated operations. In some embodiments of the present disclosure, the operations can be performed in a different order and/or vary.

Figure 5:
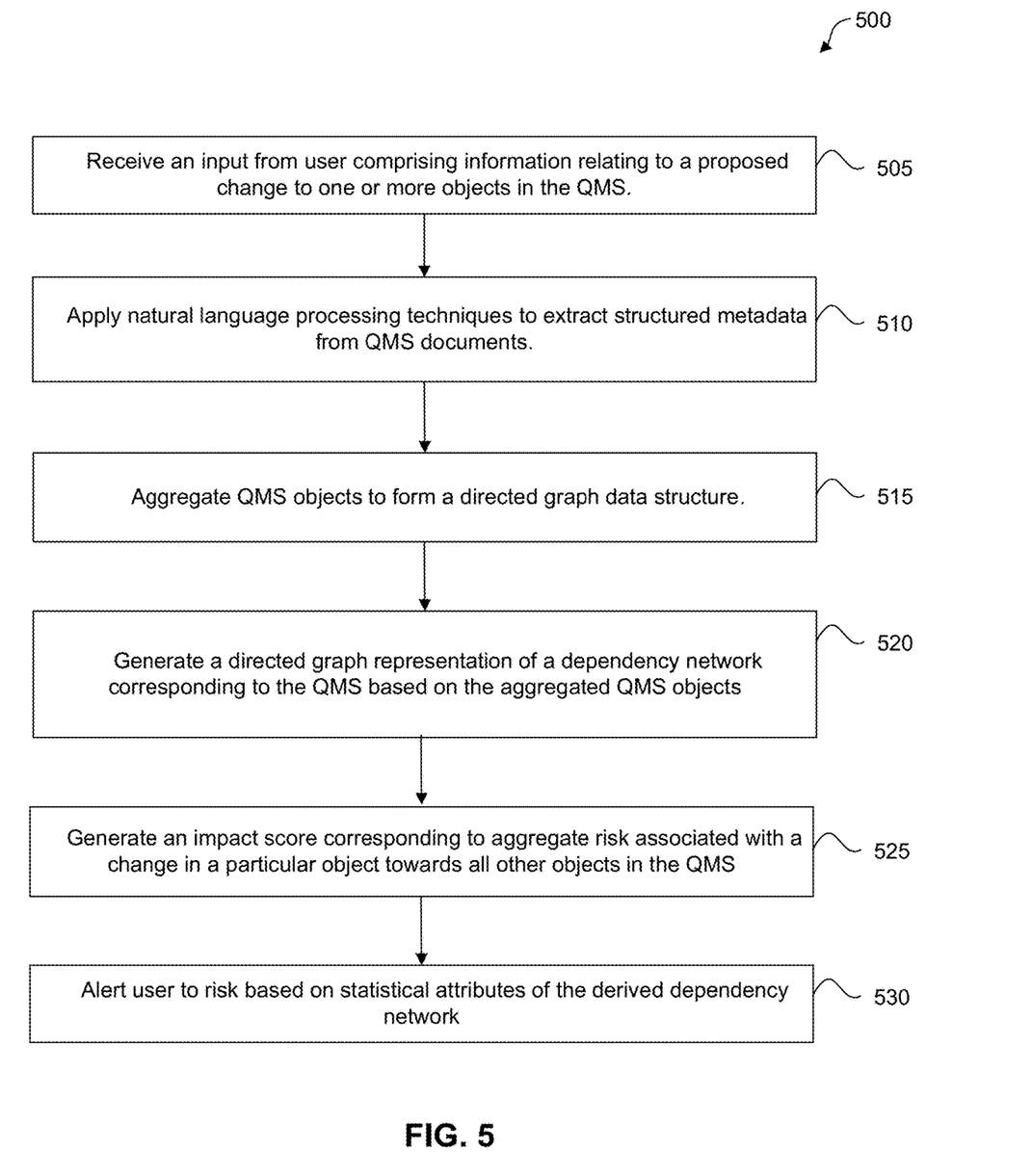
FIG. 5 is a flow diagram of a method for providing a recommendation for change management in a QMS, according to some embodiments.

FIG. 5 is a flow diagram of a method 500 for performing change management in a QMS, according to some embodiments of the present disclosure. In some embodiments, method 500 provides operational steps to identify whether a rule or node corresponds to a network traffic ingress or egress. In some embodiments, method 500 performs automated security rule feedback by determining a network traffic direction or flow. In some embodiments, method 500 performs automated security rule feedback to identify one or invoked network security rules. Based on the disclosure herein, operations in method 500 can be performed in a different order and/or vary.

At operation 505, a computing device can receive an input from a user comprising information relating to a proposed change to one or more objects in the QMS. According to some embodiments, the computing device can be an embodiment of server 102, and the input can be an embodiment of input 108. For example, server 102 can receive an input 108 from a GUI displayed on user device 106. The received input includes information relating to a proposed change to one or more QMS objects. Continuing this example, the received input can include one or more specific QMS objects designated to be changed, a written description of a change to one or more QMS objects, and a justification for the change.

At operation 510, the computing device can apply one or more natural language processing methodologies to extract structured metadata from QMS objects. According to some embodiments, the QMS objects can be an embodiment of one or more of QMS objects 110, 120, 210, 220, 230, 240, 250, 260, 310, 320, 330, 410, 420, 430, 440, 450, and/or 460. In some embodiments, the QMS objects can be one or more QMS documents.

For example, at 510, a computing device can apply natural language processing to extract structured metadata from QMS objects, such as a document or other content relating to policies, processes, and procedures required involved in planning, manufacturing, and marketing products. According to some embodiments, the products can include complex products, such as medical devices. The documents or other content can relate to QMS documents, product development artifacts, quality processes, corrective and preventative actions (CAPAs), complaints, audits, non-conformances, change records, and the like. The computing device, such as server 102, extracts structured metadata (e.g., latent references to other QMS objects, keywords, and/or vectorized topic representations) from the QMS objects. According to some embodiments, the metadata features can include latent references to other objects within the QMS, either by name or unique identifier, one or more keywords, and/or vectorized topic representations.

At operation 515, the computing device can aggregate QMS objects to form a directed graph data structure. For example, server 102 can identify dependency relationships between one or more pairs of objects in the QMS, the relationship being implied by their respective metadata features or informed directly based on the received input. Operation 515 can include aggregating QMS objects based on one or more identified dependency relationships to form a directed graph data structure.

At operation 520, the computing device can generate a directed graph representation of a dependency network corresponding to the QMS based on the aggregated QMS objects. As noted above, the aggregated QMS objects can be identified based on one or more identified dependency relationships. Operation 520 can include analyzing the identified dependency relationships and aggregated QMS objects to obtain a directed graph representation, which may include a collection of first elements (e.g., nodes, vertices, points, etc.) corresponding to respective QMS objects, a collection of second elements (e.g., directed lines or edges) representing inter-object relationships between each ordered QMS object. The directed graph representation is associated with a dependency network corresponding to the QMS based on the aggregated QMS objects, and can be formed to link all pairs of objects in the QMS having a dependency relation implied by their respective metadata features and/or an inter-object linkage informed directly by user input received (e.g., at 505). The directed graph representation can be any form of a directed graph, digraph, network, etc., that permits information about the dependency network of QMS objects to be represented. Operation 520 can include storing the directed graph representation in a data structure, such as database 103.

At operation 525, the computing device can generate an impact score corresponding to aggregate risk associated with a change in a particular object towards all other objects in the QMS. In one non-limiting example, server 102 can analyze the input received at 505, and the directed graph representation generated at 520 to evaluate the change impact path. Operation 525 can include performing analysis of potential literal citations and latent references associated with the directed graph representation. Based on the analysis, an impact score can be generated to assess aggregate risk associated with the requested change. For example, where few or no literal citations or latent references are identified based on the directed graph representation, an impact score may be minimal. Alternatively, if literal citations and/or latent references are meaningful, then an elevated impact score may be generated. At 525, the aggregate risk can be defined as a statistical measure of the likelihood that a change in one or more interdependent QMS objects may contradict or invalidate the one or more policies of another of the QMS objects. According to some embodiments, the impact of a change may be determined in a bi-directional manner. For any given pair of objects (a,b) the risks of a directed impact (e.g., a impacting b, a->b, or b impacting a, b->a) may potentially be asymmetrical |R(a->b)−R(b->a)|>=0.

At operation 530, the computing device can alert user to risk based on statistical attributes of the derived dependency network. In some embodiments, server 102 may trigger, or cause to be triggered, a notification at user device 106 that includes information about an impact score generated at 525, and/or information about one or more QMS objects designated a change impact path corresponding to the requested change. According to some embodiments, 530 can include providing one or more recommendations via user device 106 to identify or mitigate risk associated with the dependency network.

According to some embodiments, the impact score of a specific object can vary over time even if that object itself does not change. That is because the impact potential of an object is almost entirely dependent on the topology of the entire dependency network. Also, non-localized changes to one or many objects may significantly impact risk calculations for all other members of the QMS. Further, the topology of the dependency network can potentially vary as a function of the addition and deletion of new objects over time.

A recommendation methodology for change management in a QMS can include additional operations for receiving and performing a query of one or more QMS objects based on a user input. For example, method 500 can include additional steps to receive a query of one or more QMS objects input from the user, and perform a query of the QMS database according to the metadata features extracted from the input QMS objects and based on the connectivity of the input QMS objects to other objects implied by the metadata features. Based on the query, method 500 can include a step to determine relevance of objects to the query based on the combination of search parameters and the proximity of matching objects in the dependency network. Method 500 can include an additional step to determine search results associated with the impact score based on a parametric network search capability.

A recommendation methodology 500 for change management in a QMS can include additional operations to generate, in the GUI, an interactive visualization representation of the QMS objects, the dependency network, and to one or more inter-object relationship attributes, wherein the one or more inter-object relationship attributes comprise a risk score.

Figure 6:
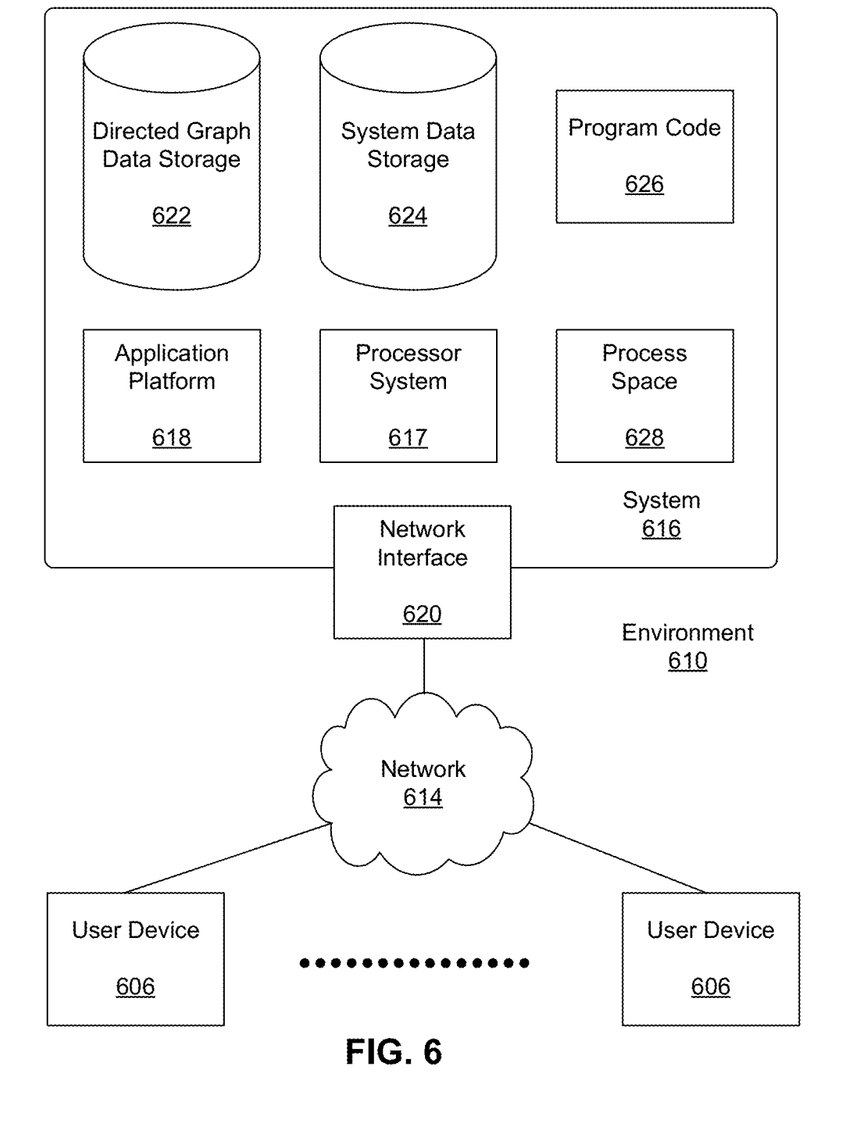
FIG. 6 is an illustration of a recommendation system for change management in a QMS, according to some embodiments.

One arrangement for elements of the system 100 is shown in FIG. 6, including the network interface 620, the application platform 618, the directed graph data storage 622 for storing a directed graph representation 623, the system data storage 624 for system data 625 accessible to the system 616, the program code 626 for implementing various functions of the system 616, and the process space 628 for executing natural language processes, and impact score analysis. As generally described above, in some embodiments, process space 628 can execute natural language processes to extract metadata features based on QMS objects, such as QMS objects 210 to 260. Additional processes that may execute on the system 216 include database indexing processes.

System 616 can include any device comprising a processor and memory. For example, system 616 can include a server that includes a memory coupled to a processor, the processor configured to execute instructions for deploying and/or managing a QMS system. Such instructions can include one or more processes to perform natural language processing techniques to extract metadata features from one or more QMS objects (e.g., 210 to 260).

Once metadata features are identified, computing device 102 can identify dependency relationships between one or more pairs of QMS objects, the relationship being implied by their respective metadata features or informed directly based on the received input. Operation 515 can include aggregating QMS objects based on one or more identified dependency relationships to form a directed graph data structure.

Computing device 102 can generate a directed graph representation of a dependency network based on the aggregated QMS objects by analyzing the identified dependency relationships and aggregated QMS objects to obtain a directed graph representation. The representation can be formed to link all pairs of objects in the QMS having a dependency relation implied by their respective metadata features and/or an inter-object linkage informed directly by user input received and the directed graph representation can be stored in a data structure (e.g., database 103 and/or directed graph data storage 622).

A database image (e.g., directed graph data storage 622) may include one or more database objects. A relational database management system (RDMS) or the equivalent may execute storage and retrieval of information against the database object(s). The application platform 618 may be a framework that allows the applications of the system 616 to run, such as the hardware and/or software, e.g., the operating system. In an embodiment, the change management system service 616 may include the application platform 618 which enables creation, managing and executing one or more applications developed by the provider of the on-demand database service, users requesting QMS changes through an interface provided via client device 106, or third-party application developers accessing the on-demand database service via the client device 106.

System 616 can include a QMS, including elements of a QMS, such as one or more QMS objects and one or more inter-object relationships. In one non-limiting example, system 616 can store QMS objects and content relating to interdependent policies, processes, and procedures required for planning, manufacturing, and marketing complex products such as medical devices, such as QMS documents, product development artifacts, quality processes, corrective and preventative actions (CAPAs), complaints, audits, non-conformances, change records, and the like.

The network 614 is any network or combination of networks of devices that communicate with one another. For example, the network 614 may be any one or any combination of a LAN (local area network), WAN (wide area network), telephone network, wireless network, point-to-point network, star network, token ring network, hub network, or other appropriate configuration. As the most common type of computer network in current use is a TCP/IP (Transfer Control Protocol and Internet Protocol) network, such as the global internetwork of networks often referred to as the "Internet" with a capital "I," that network will be used in many of the examples herein. However, it should be understood that the networks that the one or more implementations might use are not so limited, although TCP/IP is a frequently implemented protocol.

The user devices 606 might communicate with the system 616 using TCP/IP and, at a higher network level, use other common Internet protocols to communicate, such as HTTP, FTP, AFS, WAP, etc. In an example where HTTP is used, the user devices 606 might include an HTTP client commonly referred to as a "browser" for sending and receiving HTTP messages to and from an HTTP server at the system 616. Such an HTTP server might be implemented as the sole network interface between the system 616 and the network 614, but other techniques might be used as well or instead. In some implementations, the interface between the system 616 and the network 614 includes load sharing functionality, such as round-robin HTTP request distributors to balance loads and distribute incoming HTTP requests evenly over a plurality of servers.

System 616, shown in FIG. 6, implements a recommendation system for change management in a QMS. For example, in one embodiment, the system 616 includes application servers configured to implement and execute DFC software applications as well as provide related data, code, forms, webpages and other information to and from the user devices 606 and to store to, and retrieve from, a database system related data, objects, and order fulfillment content. With a recommendation system, data for QMS objects may be stored in the same physical database object, to facilitate analytics processes to identify determine an impact score of aggregate risk associated with a requested change to one or more QMS objects. For example, the system 616 may provide access to multiple hosted (standard and custom) applications, including a recommendation system service application.

Several elements in the system shown in FIG. 6 include elements that are explained only briefly here. For example, each of the user devices 606 could include a desktop personal computer, workstation, laptop, PDA, cell phone, or any wireless access protocol (WAP) enabled device or any other computing device capable of interfacing directly or indirectly to the Internet or other network connection. Each of the user devices 606 typically runs an HTTP client, e.g., a browsing program, such as Microsoft's Edge browser, Google's Chrome browser, Opera's browser, or a WAP-enabled browser in the case of a cell phone, PDA or other wireless device, or the like, allowing a user of the user devices 606 to access, process and view information, pages and applications available to it from the system 616 over the network 614. Each of the user devices 606 also typically includes one or more user interface devices, such as a keyboard, a mouse, trackball, touch pad, touch screen, pen or the like, for interacting with a graphical user interface (GUI) provided by the browser on a display (e.g., a monitor screen, LCD display, etc.) in conjunction with pages, forms, applications and other information provided by the system 616 or other systems or servers. For example, the user interface device may be used to access data and applications hosted by the system 616, and to perform searches on stored data, and otherwise allow a user to interact with various GUI pages that may be presented to a user. As discussed above, embodiments are suitable for use with the Internet, which refers to a specific global internetwork of networks. However, it should be understood that other networks may be used instead of the Internet, such as an intranet, an extranet, a virtual private network (VPN), a non-TCP/IP based network, any LAN or WAN or the like.

According to one embodiment, each of the user devices 606 and all of its components are operator configurable using applications, such as a browser, including computer code run using a central processing unit such as an Intel Pentium® processor or the like. Similarly, the system 100 (and additional instances of an MTS, where more than one is present) and all of their components might be operator configurable using application(s) including computer code to run using a central processing unit such as the processor system 617, which may include an Intel Pentium® processor or the like, and/or multiple processor units. A computer program product embodiment includes a machine-readable storage medium (media) having instructions stored thereon/in which may be used to program a computer to perform any of the processes of the embodiments described herein. Computer code for operating and configuring the system 616 to intercommunicate and to process webpages, applications and other data and media content as described herein are, for example, downloaded and stored on a hard disk, but the entire program code, or portions thereof, may also be stored in any other volatile or non-volatile memory medium or device as is well known, such as a ROM or RAM, or provided on any media capable of storing program code, such as any type of rotating media including floppy disks, optical discs, digital versatile disk (DVD), compact disk (CD), micro-drive, and magneto-optical disks, and magnetic or optical cards, Nano-systems (including molecular memory ICs), or any type of media or device suitable for storing instructions and/or data. Additionally, the entire program code, or portions thereof, may be transmitted and downloaded from a software source over a transmission medium, e.g., over the Internet, or from another server, as is well known, or transmitted over any other conventional network connection as is well known (e.g., extranet, VPN, LAN, etc.) using any communication medium and protocols (e.g., TCP/IP, HTTP, HTTPS, Ethernet, etc.) as are well known. It will also be appreciated that computer code for implementing embodiments may be implemented in any programming language that may be executed on a client system and/or server or server system such as, for example, C, C++, HTML, any other markup language, Java™, JavaScript, ActiveX, any other scripting language, such as VBScript, and many other programming languages as are well known may be used. (Java™ is a trademark of Sun Microsystems, Inc.).

It is to be appreciated that the Detailed Description section, and not the Summary and Abstract sections, is intended to be used to interpret the claims. The Summary and Abstract sections may set forth one or more but not all exemplary embodiments of the present invention as contemplated by the inventor(s), and thus, are not intended to limit the present invention and the appended claims in any way.

The present invention has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments but should be defined only in accordance with the following claims and their equivalents.

What is claimed is:

1. A change management system for Quality Management System (QMS) dependency visualization, comprising:
   a server, coupled to a processor, and configured to execute instructions that:
   receive an input from a user, the input comprising information relating to a proposed change to one or more objects (QMS objects) in a QMS (QMS network) via a graphical user interface (GUI), comprising a written description and justification for the change.
   apply natural language processing techniques to extract structured metadata from the one or more QMS objects; and
   generate an impact score corresponding to aggregate risk associated with a change in a first QMS object towards all other QMS objects in the QMS, wherein risk is defined as a statistical measure of the likelihood that a change in one or more interdependent QMS objects may contradict or invalidate the one or more policies of another of the QMS objects,
   wherein the impact of a change may be determined in a bi-directional manner, such that for any pair of objects (a,b) the risks of a directed impact (a impacting b, a->b, or b impacting a, b->a) are potentially asymmetrical |R(a->b)-R(b->a)|>=0,
   wherein the QMS network is an intranet, an extranet, a virtual private network (VPN), a non-TCP/IP based network, or any LAN,
   wherein the metadata features comprise latent references to other objects within the QMS, either by name or unique identifier, and
   wherein the metadata features comprising one or more keywords and/or vectorized topic representations.

2. The change management system of claim 1, the server further configured to execute instructions that:
   aggregate QMS objects to form a directed graph data structure;
   generate a directed graph representation of a dependency network corresponding to the QMS based on the aggregated QMS objects, the directed graph data structure being formed to link all pairs of objects in the QMS having a dependency relation implied by their respective metadata features and/or an inter-object linkage informed directly by user input;
   store the directed graph representation in a searchable computer database.

3. The change management system of claim 1, the server further configured to execute instructions that:
   alert the user to the risk according to the statistical attributes of the derived dependency network; and
   provide one or more recommendations for actions identify or mitigate the risk.

4. The change management system of claim 1, wherein the impact score of a specific object that may vary over time even if that object itself has not changed, wherein the impact potential of an object is almost entirely dependent on the topology of the entire dependency network,
   wherein non-localized changes to one or many objects may significantly impact risk calculations for all other members of the QMS, and
   wherein the topology of the dependency network will also vary as a function of the addition and deletion of new obj ects over time.

5. The change management system of claim 1, the server further configured to execute instructions that alert the user to changes in the impact score of one or many objects and generate visual representations in the GUI reflecting the temporal variation of such statistics over time.

6. The change management system of claim 1, the server further configured to execute instructions that:
   receive a query of one or more QMS objects input from the user;
   perform a query of the QMS database according to the metadata features extracted from the input QMS objects and based on the connectivity of the input QMS objects to other objects implied by the metadata features;
   determine relevance of objects to the query based on the combination of search parameters and the proximity of matching objects in the dependency network; and
   determine search results associated with the impact score based on a parametric network search capability.

7. The change management system of claim 1, the server further configured to execute instructions that include:
   generate, in the GUI, an interactive visualization representation of the QMS objects, the dependency network, and to one or more inter-object relationship attributes, wherein the one or more inter-object relationship attributes comprise a risk score.

8. A computer-implemented method, comprising:
   receiving an input from a user, the input comprising information relating to a proposed change to one or more objects (QMS objects) in a QMS (QMS network) via a graphical user interface (GUI), comprising a written description and justification for the change;

applying natural language processing techniques to extract structured metadata from the QMS objects;

aggregating the QMS objects to form a directed graph data structure;

generating a directed graph representation of a dependency network corresponding to the QMS based on the aggregated QMS objects, the directed graph data structure being formed to link all pairs of objects in the QMS having a dependency relation implied by their respective metadata features and/or an inter-object linkage informed directly by user input;

storing the directed graph representation in a searchable computer database; and generating an impact score corresponding to aggregate risk associated with a change in a first QMS object towards all other QMS objects in the QMS, wherein risk is defined as a statistical measure of the likelihood that a change in one or more interdependent QMS objects may contradict or invalidate the one or more policies of another of the QMS objects, and wherein the impact of a change may be determined in a bi-directional manner, such that for any pair of objects (a,b) the risks of a directed impact (a impacting b, a->b, or b impacting a, b->a) are potentially asymmetrical $|R(a\text{->}b)-R(b\text{->}a)|\text{>=}0$, wherein the QMS network is an intranet, an extranet, a virtual private network (VPN), a non-TCP/IP based network, or any LAN, wherein the metadata features comprise latent references to other objects within the QMS, either by name or unique identifier, and wherein the metadata features comprising one or more keywords and/or vectorized topic representations.

9. The computer-implemented method of claim 8, further comprising:

alerting the user to the risk according to the statistical attributes of the derived dependency network; and providing one or more recommendations for actions identify or mitigate risk.

10. The computer-implemented method of claim 8, wherein an impact score of the first QMS object may vary over time, even if the first QMS object has not changed, wherein an impact potential of an object is based on the topology of the entire dependency network, wherein non-localized changes to one or many objects may significantly impact risk calculations for all other members of the QMS, and wherein the topology of the dependency network can vary as a function of the addition and deletion of new objects over time.

11. The computer-implemented method of claim 8, further comprising:

alerting the user to changes in the impact score of one or more QMS objects; and generating visual representations in the GUI reflecting the temporal variation of such statistics over time.

12. The computer-implemented method of claim 8, further comprising:

receiving a query of one or more QMS objects input from the user;

performing a query of the QMS database according to the metadata features extracted from the input QMS objects and based on the connectivity of the input QMS objects to other objects implied by the metadata features;

determining relevance of objects to the query based on the combination of search parameters and the proximity of matching objects in the dependency network; and determining search results associated with the impact score based on a parametric network search capability.

13. A non-transitory tangible computer-readable device having instructions stored thereon that, when executed by a computing device, cause the computing device to perform operations comprising:

receiving an input from a user, the input comprising information relating to a proposed change to one or more objects (QMS objects) in a QMS (QMS network) via a graphical user interface, comprising a written description and justification for the change;

applying natural language processing techniques to extract structured metadata from the QMS objects;

aggregating the QMS objects to form a directed graph data structure;

generating a directed graph representation of a dependency network corresponding to the QMS based on the aggregated QMS objects, the directed graph data structure being formed to link all pairs of objects in the QMS having a dependency relation implied by their respective metadata features and/or an inter-object linkage informed directly by user input;

storing the directed graph representation in a searchable computer database; and generating an impact score corresponding to aggregate risk associated with a change in a first QMS object towards all other QMS objects in the QMS, wherein risk is defined as a statistical measure of the likelihood that a change in one or more interdependent QMS objects may contradict or invalidate the one or more policies of another of the QMS objects, and wherein the impact of a change may be determined in a bi-directional manner, such that for any pair of objects (a,b) the risks of a directed impact (a impacting b, a->b, or b impacting a, b->a) are potentially asymmetrical $|R(a\text{->}b)-R(b\text{->}a)|\text{>=}0$, wherein the QMS network is an intranet, an extranet, a virtual private network (VPN), a non-TCP/IP based network, or any LAN, wherein the metadata features comprise latent references to other objects within the QMS, either by name or unique identifier, and wherein the metadata features comprising one or more keywords and/or vectorized topic representations.

14. The computer-readable device of claim 13, the operations further comprising:

alerting the user to the risk according to the statistical attributes of the derived dependency network; and providing one or more recommendations for actions identify or mitigate risk.

15. The computer-readable device of claim 13, wherein an impact score of the first QMS object may vary over time, even if the first QMS object has not changed, wherein an impact potential of an object is based on the topology of the entire dependency network, wherein non-localized changes to one or many objects may significantly impact risk calculations for all other members of the QMS, and wherein the topology of the dependency network can vary as a function of the addition and deletion of new objects over time.

16. The computer-readable device of claim 13, the operations further comprising:
- alerting the user to changes in the impact score of one or more QMS objects; and
- generating visual representations reflecting the temporal variation of such statistics over time.

17. The computer-readable device of claim 13, the operations further comprising:
- receiving a query of one or more QMS objects input from the user;
- performing a query of the QMS database according to the metadata features extracted from the input QMS objects and based on the connectivity of the input QMS objects to other objects implied by the metadata features;
- determining relevance of objects to the query based on the combination of search parameters and the proximity of matching objects in the dependency network; and
- determining search results associated with the impact score based on a parametric network search capability.

* * * * *